H. E. GOLDBERG (NOW BY JUDICIAL CHANGE OF NAME H. GOLBER).
ALGEBRAIC TOTAL CALCULATING MACHINE.
APPLICATION FILED AUG. 20, 1913.

1,296,073.

Patented Mar. 4, 1919.
4 SHEETS—SHEET 1.

H. E. GOLDBERG (NOW BY JUDICIAL CHANGE OF NAME H. GOLBER).
ALGEBRAIC TOTAL CALCULATING MACHINE.
APPLICATION FILED AUG. 20, 1913.

1,296,073.

Patented Mar. 4, 1919.
4 SHEETS—SHEET 4.

UNITED STATES PATENT OFFICE.

HYMAN ELI GOLDBERG, (NOW BY JUDICIAL CHANGE OF NAME HYMAN GOLBER,) OF CHICAGO, ILLINOIS, ASSIGNOR TO GOLDBERG CALCULATING MACHINE COMPANY, OF CHICAGO, ILLINOIS, A CORPORATION OF ILLINOIS.

ALGEBRAIC-TOTAL CALCULATING-MACHINE.

1,296,073.　　　　　Specification of Letters Patent.　　Patented Mar. 4, 1919.

Application filed August 20, 1913.　Serial No. 785,670.

*To all whom it may concern:*

Be it known that I, HYMAN ELI GOLDBERG, a citizen of the United States, residing at Chicago, in the county of Cook and State of Illinois, have invented certain new and useful Improvements in Algebraic-Total Calculating-Machines, of which the following is a specification.

My invention is a machine by means of which the total of a series of additions and subtractions is obtained in its true form whether said total be positive or negative.

More specifically, my invention is a mechanism by means of which the algebraic total can be obtained on calculating machines provided with a totalizer and a master wheel which moves relatively thereto.

Still more specifically, my invention is an algebraic-total mechanism particularly adapted to typewriter attachments like the Wahl now on the market, which Wahl machine is described in Patent No. 893,719, issued July 21, 1908.

The main object of my invention is to construct a machine accomplishing the results above stated.

Referring to the additional parts necessary to transform a non-algebraic totalizer into an algebraic totalizer: Another object of my invention is to transfer as many of said parts as possible from the totalizer proper into the actuator therefor. The purpose of this is to eliminate as largely as possible the necessity of duplicating parts in the use of this machine with a plurality of totalizers.

It might therefore be said that an object of my invention is to make an algebraic-total calculating machine provided with a plurality of independent totalizers. Each of these totalizers shall be able to calculate an algebraic total. These totalizers shall be provided with a minimum of extra parts necessitated by the algebraic character of the total. The main algebraic mechanism is to be located on the operating mechanism for the totalizers. Thus there will be only one main algebraic mechanism, which will transform a whole set of ordinary totalizers into algebraic totalizers.

Another object of my invention is to construct an algebraic total mechanism, to be used in conjunction with a typewriter attachment, which mechanism will be simple in construction and positive in its operation.

The mechanism is illustrated by the accompanying drawings, of which,—

It is well known in the theory of algebraic totalizers that a non-algebraic totalizer may be converted into an algebraic totalizer (1) by providing its carrying wheels with two sets of numerals, one set running from 0 to 9, and the other set running from 9 to 0, the pairing being 0–9, 1–8, etc.; and (2) by inserting an extra one in the lowest place of the totalizer whenever the highest place of said totalizer passes through zero. The inserting of this extra one in the lowest place is in the same direction as the inserting of the number which causes the highest wheel to cross the zero point.

Attention is called to the fact that the inserting of the extra one in the lowest place under certain circumstances results in the carrying of this extra one from the lowest place up to and into the decimal place being operated. For instance, if the totalizer be an eight-place totalizer and the number on it be 00002000, and it is attempted to subtract from said number the number 3000, the operation would result in the subtracting of the 3 from the 2. At this stage there are zeros both to the right and to the left of the decimal place being operated on. An attempt to subtract a 1 in the units place of said totalizer (the 1 must be subtracted because the 3000 is being subtracted by hypothesis), under these circumstances, would produce the result that this extra 1 would be carried subtractively from the units into the tens, from the tens into the hundreds, and into the thousands, that is, right into the decimal place which is being operated by the master wheel.

In order that no mistake may occur under these circumstances, it is necessary that the decimal place operated on may receive not only the amount of movement required on account of the number subtracted in said place (namely 3), but also the additional movement required on account of the carrying into it of the extra 1, due to the change of sign. Re-stated: Whenever there are zeros both to the right and to the left of any decimal place, the carrying wheel of said place must be able to receive an aggregate movement due to both digitation and algebraic carrying.

In certain mechanisms with which I am acquainted, this aggregate movement is accomplished by delaying the algebraic carrying until after the inserting of the new number.

In certain mechanisms of the prior art the algebraic totalizer mechanism is confined entirely to the totalizer in which numbers are inserted by the actuating mechanism. These mechanisms, however, are needlessly complicated, since I have discovered that the desired result could be obtained by providing an algebraic mechanism which is common to a plurality of totalizers and adapted to operate in conjunction with each one of said totalizers and in further providing means by which this algebraic mechanism may be brought into coöperation with each totalizer successively. The present mechanism is in the nature of a variation of the mechanism shown in my copending application, Serial No. 786,705, filed August 26, 1913, and in said application I have placed the generic claims to my invention of providing a common algebraic mechanism which is adapted to coöperate in conjunction with a plurality of totalizers. I do not wish to make any of the generic claims to said invention in this application, but have confined the claims to features which are peculiar to the mechanism shown in this present application.

The general construction of the machine is the same as now on the market and as illustrated in the above cited Patent, No. 893,719. It will therefore not be necessary to give a complete description of the machine, and only such parts will be described as are necessary to the understanding of the new invention.

It is, of course, understood that the calculating machine is mounted upon a typewriter, preferably the Remington typewriter now on the market, to whose frame the actuating portion of the calculating machine is fastened. It operates in conjunction with the carriage of the typewriter to whose frame the totalizer bar of the calculating attachment is fastened. It is also operated by the numeral keys of the typewriter, to which numeral keys are fastened links operating the digiting mechanism of the attachment.

In the drawings: 1 indicates stationary framework. It is immaterial whether this framework is a portion of the typewriter proper or of the calculating attachment fastened thereto. 2 indicates the totalizer bar of the attachment. 3 indicates a set of links, one of which is fastened to each of the numeral keys of the typewriter.

The links are fastened to fan-shaped pieces 4 which coöperate with goose-necks 5. There is a sector-shaft 6 mounted in the framework and provided with a set of arms 7, one for each goose-neck. The depressing of a numeral key and consequent reciprocating of the goose-neck causes the sector-shaft to be displaced a distance dependent on the value of the numeral key then operating. The sector-shaft is provided with a sector 8 pivotally mounted thereon, which sector is provided with gear-teeth 9 which mesh and unmesh with either the direct gear 10 or the reverse gear 11. The direct gear 10 is splined to its shaft 12, to which is rigidly fastened the master gear 13. The fan-shaped pieces 4 are provided with rises 14 which operate a roller-shaft 15 swinging as a bail about a rock-shaft 16. The rock-shaft is provided with a helical cam 17 which reciprocates a sliding plate 18 which grasps the sector 8. There is also a locking pawl 19, which serves to lock and unlock the master wheel. This locking pawl is operated by the rock-shaft.

The above parts are all old, and are thoroughly described in the above cited Patent, No. 893,719, where any further explanation desired may be found.

Figure 1:
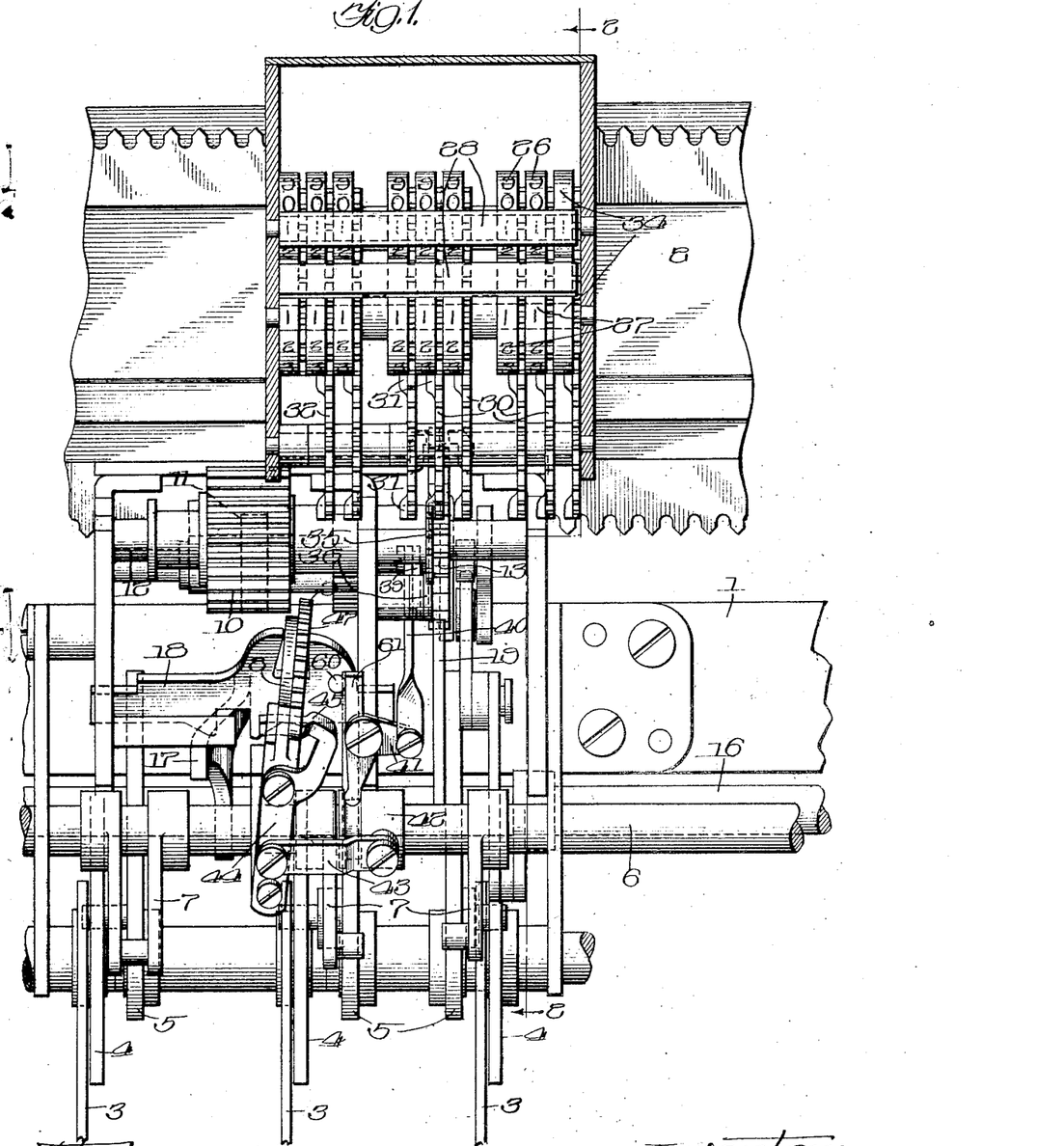
Figure 1 represents a portion of a totalizer, and an actuator therefor, drawn in elevation. The covers are removed, and not all the parts are shown.

The timing of the movements of the parts is as follows: Normally: the sector is as shown in Fig. 1; that is, it is out of mesh with the direct gear by being inclined to the right; the master wheel is locked by its pawl. During the stroke of the key (1), the rock-shaft and helical cam are moved and the sector is placed perpendicular to the sector-shaft and also in engagement with its mating gear, in this case the direct gear. Then (2) the locking pawl unlocks the master wheel. These preliminary initial operations caused by the rock-shaft being over, (3) the sector-shaft is displaced from its normal zero position a distance dependent on the value of the driving numeral key and comes to rest. The sector, direct gear and master wheel, thus also come to rest. Then follows a final set of operations again caused by the rock-shaft, namely, (4) the master wheel becomes locked, and then (5) the sector is again displaced to the right, and thus gets out of mesh with its mating gear. All the above movements take place during the stroke of the driving numeral key. On the re-stroke of said key, (6) the sector returns from its displaced position into its normal position, but does not engage its mating wheel. Neither does the master wheel become unlocked during said re-stroke.

The return of the sector-shaft from its displaced to its normal position is brought about through a spring. It is therefore not positive. The return of the sector from its meshing perpendicular position to its unmeshed inclined position is also brought about through a spring. The bringing of the sector into mesh is, however, brought about positively by the force applied by the operator to the numeral key of the typewriter.

Figures 2, 3:
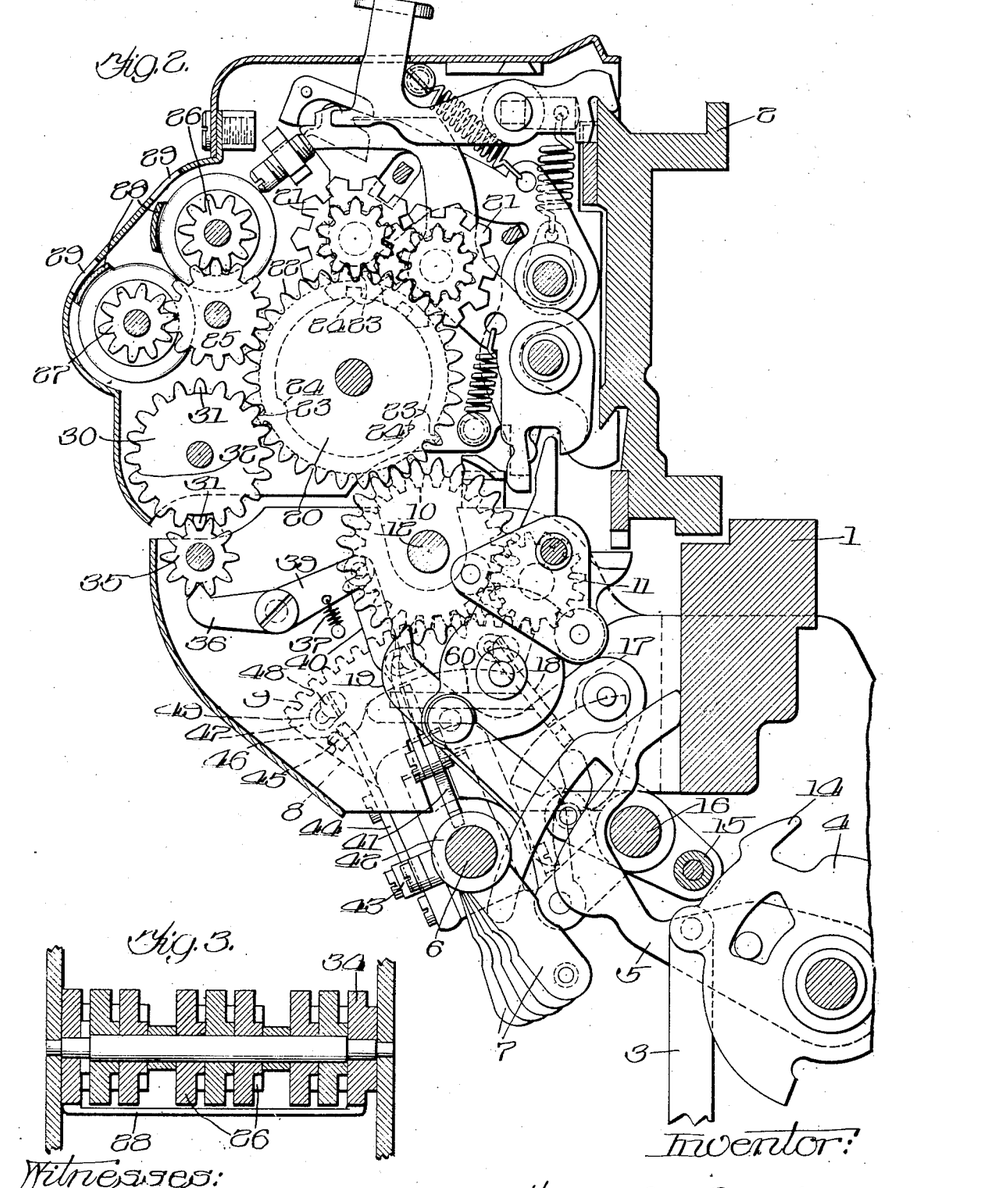
Fig. 2 represents a view of about the same mechanism as drawn in Fig. 1. The drawing is a section taken along the plane 2—2 of Fig. 1.
Fig. 3 shows the shutter mechanism.
Figure 4:
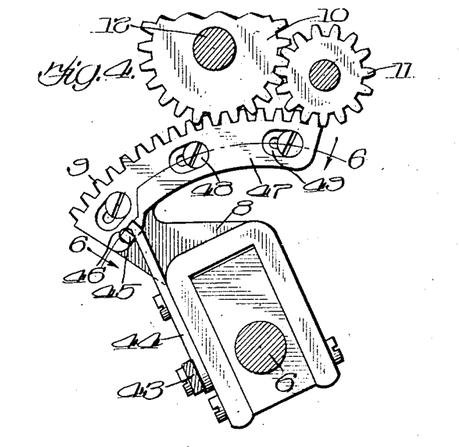
Figs. 4, 5 and 6 show views of the gear sector and its coöperating mechanism.
Figure 5:
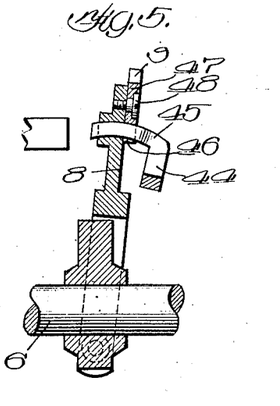
Figure 6:
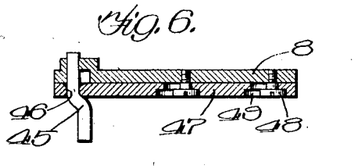

The master wheel 13 serves to drive the carrying wheels 20 of the totalizer. These carrying wheels coöperate with carryable wheels 21, which serve to carry the tens from a lower carrying wheel into the next higher one. For the purposes of convenience (to get room), the single set of carryable wheels has been arranged in two series, as shown in Fig. 2. As is well known, the carrying wheels are each provided with a thirty-toothed gear 22, by means of which it may be driven, a three-toothed mutilated gear 23, and a three-scalloped disk 24. The three-toothed gear 23 serves to carry the tens, and the three-scalloped disk serves to prevent overthrow.

It is well known in the theory of totalizers that a wheel is at zero whenever one of its carrying teeth is immediately adjacent its coöperating carryable wheel. In order that this totalizer shall be all at zero, each carrying wheel must have one of its teeth brought to its zero position, that is, adjacent to its carryable wheel. However, as the carryable wheels are not all in alinement, this results in the fact that when the totalizer is at zero, the carrying teeth of the carrying wheels are not all in alinement.

The mechanism of the totalizer so far described is also old, and also to be found in the cited patent. I shall now enter upon the description of the new mechanism.

Figure 7:
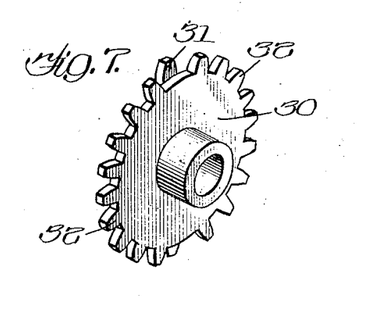
Fig. 7 shows the special twenty-toothed gear in detail.

Meshing with each carrying gear 20 is an idle gear 25. Meshing with each idle gear are two numeral wheels 26 and 27. Both numeral wheels are provided with numerals running from 0 to 9, inclusive, but the numerals on one wheel run in the reverse direction from those upon the other. Fastened to the highest order numeral wheel of each of the sets is a shutter 28. As seen in Fig. 2, the shutters are so placed that when one is uncovering the numerals at its sight slot 29 in the cover of the totalizer, the other shutter is in alinement with its sight slot, and thus prevents the seeing of the numerals underneath. Meshing with each of the carrying wheels 20 is a twenty-toothed gear 30. Fig. 7 shows said gear in detail. It will be seen that said gear has two diametrically opposed teeth displaced out of their plane and moved into a position to the left. These special displaced teeth are numbered 31. The rest are numbered 32. There is no trouble encountered in the driving of the special gear 30 by means of the carrying-wheel gear 22, in spite of the displacement of the teeth because the arc of contact of the gears 30 and 22 is greater than the arc of one tooth, therefore one of the teeth may be missing and yet preserve the proper action of the gears.

The twenty-toothed gears 30 are so meshed with the thirty-toothed carrying wheels 20 that when the totalizer is at zero, the special teeth 31 are in alinement, and not out of alinement, as are the carrying teeth 23 of the carrying wheels. As a matter of fact, this lack of alinement of the carrying teeth 23 of the carrying wheels when the totalizer is at zero is the main reason why the special gears 30 have been introduced. They might therefore be considered as a portion of the carrying wheels, in so far as their function is concerned.

The shutters 28 extending from the numeral wheels of the highest order reach one step to the right of the units numeral wheel. There the shutters are fastened to a special disk 34, which might be considered as a blind numeral wheel. Meshing with said special disk 34 is also a special idle gear 25 and a special carrying wheel 20. Meshing with this carrying wheel 20 is a special twenty-toothed gear 30. Any rotation given to the highest numeral wheel or carrying wheel is thus reverted into the special mechanism provided in the sub-units place.

In an ordinary totalizer the units carrying wheel is not provided with any mechanism whereby carrying into it can be accomplished. In this algebraic totalizer, however, the units carrying wheel is provided with a carryable wheel 21 whereby carrying into the units can be accomplished from the sub-units place. Thus, by means of the reverted chain just described, whenever the highest carrying wheel passes through zero, the sub-unit special carrying wheel carries a one into the units carrying wheel.

Mounted in the frame work immediately underneath the gear 30 is a thin gear 35. There is only one such gear in the whole machine. Laterally it is located a little to the right of the master wheel. It is thus meshable by the special tooth 31 of the decimal section immediately to the right of the master wheel. The gear 35 is thin enough not to be struck by the teeth 32 of the totalizer. There is a locking pawl 36 provided with a spring 37 which prevents accidental displacement of the gear 35. The locking pawl 36 is provided with an arm 39, which, by means of a link 40, is connected to one arm of a bell crank 41 mounted upon the framing. This bell crank engages a collar 42 slidably mounted upon the sector-shaft 6. Extending from the collar 42 is a link 43 fastened to the lower arm of a lever 44 pivotally mounted upon the swinging sector 8. Attention is called to the fact that the link 43 is joined to the lever 44 very close to the axis of the sector-shaft. The upper portion of the lever 44 is provided with a cam 45 which is embraced in a slot 46 forming part of a gear-segment 47. It is this gear-segment 47 which is provided with the gear-teeth 9. In the machine described in Patent No. 893,719, this gear-segment is rigid with the sector itself. In this machine the gear-segment is not rigid therewith, but is held by means of studs 48 passing through slots 49. The gear-segment is thus capable of having an angular displacement of one step about the axis of the sector-shaft.

Resuming the theory of the algebraic totalizer: We will assume that the numbers are entered into the totalizer figure by figure, to conform with the mode of operation of this machine. Let us assume that the number on the totalizer is 00000096. Suppose 100 be subtracted therefrom. Then the highest wheel of the totalizer will pass through the zero point, and by the construction described the units wheel of the totalizer will have a one carried thereinto. But because said units wheel of the totalizer is not at the carrying point, this carrying will extend no farther; similarly, if the number on the totalizer were originally 00000090. Now the carrying into the units wheel will extend from the units wheel into the tens wheel. But as the latter is not at the carrying point, the carrying will not extend any farther. (This is because the carrying point for subtraction is not 9, but 0. The carrying in this particular case is subtractive.) In both of said cases, the special algebraic carrying into the units place does not extend to the decimal place engaged by the master wheel. There has previously been described one case where it does extend into the carrying wheel engaged by the master wheel, namely, the case where there are zeros both to the right and to the left.

Now let us return to the mechanism. Whenever the highest carrying wheel passes through zero, the sub-unit special gear 30 moves one step. This causes the carrying into the units of a special one. This special one is transmitted no farther in case the units wheel is not at the carrying point. In case it is at the carrying point, it is transmitted to the next wheel, etc. It thus results that the gear 30 in mesh with the gear 35 either is carried on account of this transmission, or is not carried. The only case when it will be carried is whenever all the wheels to the right are at the carrying point. Now assuming that it will be carried, then two cases have to be distinguished. First, it itself is not at the carrying point. Then, its special tooth 31, although opposite, will not be adjacent the thin gear 35, and although the special tooth will be moved, it will cause no rotation of the gear 35. Now, assume that it is at the carrying point. Therefore its tooth 31 will be in mesh with the thin gear 35, and its movement will cause said gear 35 to move. Therefore, finally, the only time when the gear 35 will move one step is the time when the carrying wheel immediately to the right of the master wheel is algebraically carried, and, moreover, when it itself is at the carrying point. We have already seen that this is the only case where the carrying wheel in engagement with the master wheel should have one extra step of movement. This step of movement is given to it in this case, and only in this case, by the mechanism already described, which will now be reviewed.

The rotation of the gear 35 causes the displacement of the pawl 36. By the intermediate parts above mentioned, the displacement of the pawl 36 causes the sliding to the right of the collar 42. This, in turn, by means of the link 43 and lever 44, moves the cam 45 to the left. The cam thus causes the gear-segment 47 to advance one step relatively to the sector. The sector in itself, by means of the mechanism previously mentioned and described in the cited patent, already has the movement due to the numeral key operated. The movement of the segment produced by the cam 45 is additional to the digital movement of the sector. The result therefore is that the direct gear 10 in engagement with the segment is given not only the digital movement, but also this extra movement of one step. The master wheel therefore, under these circumstances, has imparted thereto both the digital steps and the algebraic step simultaneously.

To review what has been said above, there are three possible cases in which algebraic carrying may occur. The first is in the example 96 minus 100. In this case the carrying will stop in the units place and the special mechanism of my invention will not be called into operation. An example typical of the second case is 80 minus 100. In this case, while the units wheel is at zero the carrying chain will stop at the wheel in the tens order since this wheel is in the 8 position and therefore will not carry into the wheel of higher order. A typical example of the third case is 100 minus 200. In this case when the totalizer passes through zero the carrying chain is completed into the actuated wheel. Therefore the gear 30 functions and by its action on the thin gear 35 advances the master wheel an extra step. The mechanism by which this action is performed has been thoroughly described in the preceding paragraph.

There will now be described the mechanism by means of which the segment is returned from its algebraically-carried into its normal position upon the sector. This returning takes place during the inclining of the sector about its fulcrum, that is, during the return thereof from its position perpendicular to the sector axis and in mesh with its mating gear into its position inclined to the axis and out of mesh with its mating gear. The sliding plate 18 which causes the swinging of the sector about its fulcrum is provided with a pin 60 which in its normal position contacts with an arm 61 forming part of the bell crank 41. In their normal position the parts are as shown in Fig. 2. During the stroke of a key, the pin 61 moves toward the left away from the arm 61, which is thus released to be free to move in case any such movement is imparted to it during the continuation of said stroke. If it is not moved during said stroke, no returning is necessary. If it is moved during said stroke, then at the end thereof the pin 60 strikes the arm 61, which under these circumstances will be displaced toward the left and will replace said arm in its normal position. This will bring back the segment into its normal position upon the sector. Attention is called to the fact that this replacement of the segment upon the sector is timed to occur subsequent to the unmeshing of the segment with the direct gear.

Figures 8, 10:
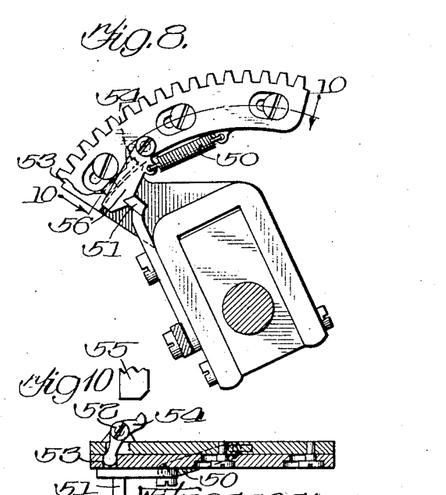
Figs. 8, 9 and 10 show a substitute mechanism for the one illustrated in Figs. 4, 5 and 6.
Figure 9:
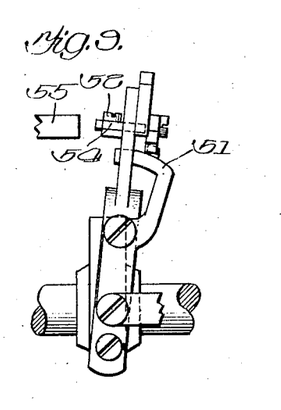
Figure 11:
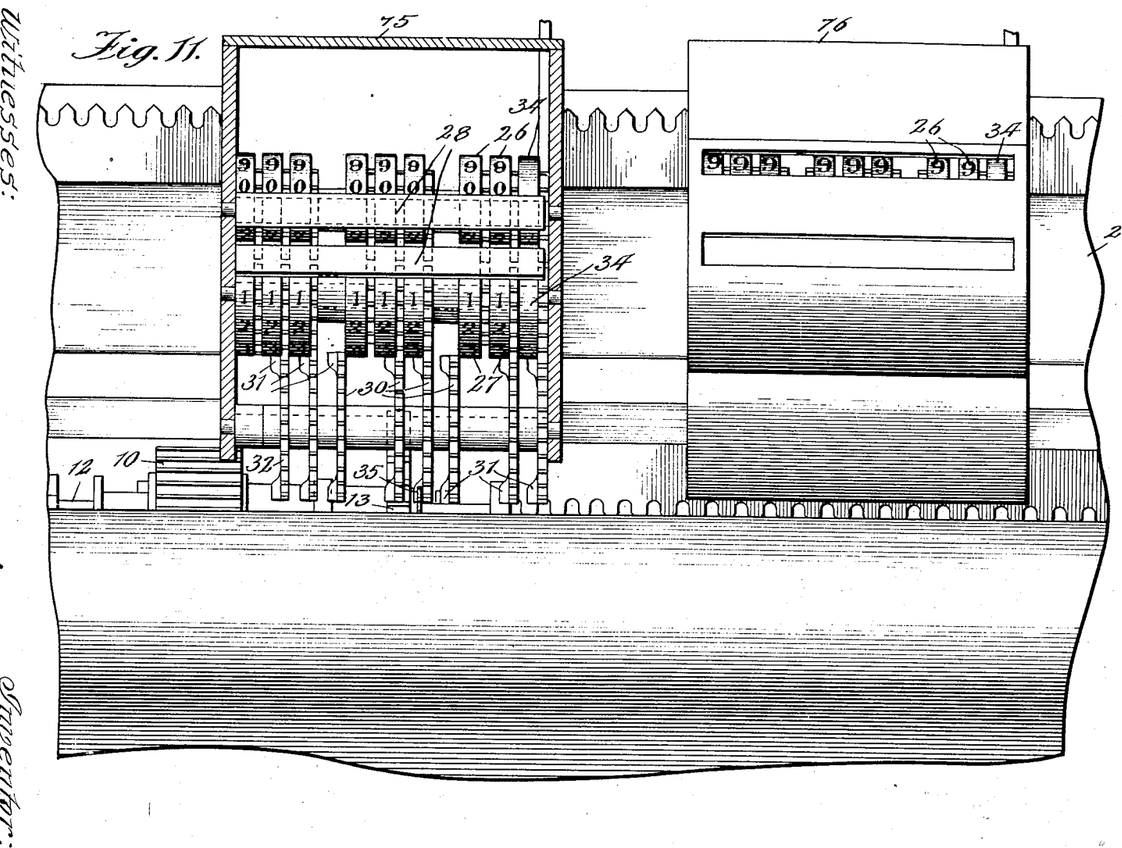
Fig. 11 is a front view of a plurality of totalizers mounted on the typewriter carriage.

The mechanism above described has the extra step of movement given to the master wheel by means of the positive mechanism, namely the cam 45. A variation has been thought of. It differs from the one described in the fact that the movement of the wheel 35, instead of forcing the segment to move an extra step, simply releases spring mechanism, which by its own force moves the segment the extra step. This is illustrated in Figs. 8, 9 and 10. The segment is here provided with a spring 50 having one end fastened to the segment and the other end to the sector. The lever 44 has had the cam 45 removed, and in its stead has been substituted a pawl 51. The rotation of the thin gear 35 causes the withdrawal of the pawl 51 from the segment, whereupon the spring 50 moves said segment one step extra. The resetting of the segment to its normal loaded position is produced as follows:

Fulcrumed upon the sector is a small bell crank 52. The bell crank is provided with one arm 53 which engages the segment, and another arm 54. The movement of the segment in relation to the sector causes the arm 54 to protrude itself to the left. It has previously been stated that during the initial portion of the stroke the sector is moved to the left into a plane perpendicular to the axis of the sector shaft. The bell crank 52 is carried along. Normally the arm 54 is in its position to the right, but should the segment, under the influence of the spring, have moved its special step, then the arm 54 is protruded to the left. When the sector is brought into its position perpendicular to the axis of the sector shaft (during the inserting of the next digit), the arm 54, under these circumstances, strikes a rigid abutment 55. It is thus shoved back to its normal position to the right, which thus causes the segment to be returned to its normal position. It moves back far enough to snap over the pawl 51, which immediately locks it in said normal loaded position. In order to prevent the clicking back of the pawl 51, and thus to avoid interference with the extension 38, the engagement of the segment and the pawl 51 is not direct, but through the intermediation of another pawl 56.

The mechanism above described is what might be called an aggregate-movement mechanism for the sector. Really, however, it is not the sector that requires the aggregate movement, but the master wheel, and the only reason why it is the sector that has been given the aggregate movement is convenience. The mechanism might be considered an aggregate-movement mechanism for the master wheel.

Pursued still further, the body that requires the aggregate movement is not even the master wheel, but the carrying wheel in engagement with said master wheel. It might therefore be said that this is a mechanism adapted to give the digitized carrying wheel an aggregate movement. The mechanism might thus be considered as an aggregate-movement mechanism traveling from one carrying wheel to another, which aggregate-movement mechanism permits the movement of the carrying wheel with which it is engaged both for the digit and for the carrying.

Attention is called to the fact that it is really immaterial how the aggregate-movement mechanism is moved. In the above specification two distinct modes have been illustrated. In one the movement is produced positively; in the other the movement is produced by the release of stored-up energy, namely by the spring.

In the mechanism described there is present a thin gear 35. That is for convenience only. The pawl 36 might have been directly operated by the special tooth 31. The special teeth 31 might have been rigid with the carrying wheels themselves. Various other modifications can easily be made in the structure without departing from the spirit of the invention.

I claim:

1. In a calculating machine, the combination of: a plurality of carrying wheels; a master mechanism operating on the carrying wheels successively and engaging them *seriatim;* differential mechanism adapted to operate said master wheel; and means operated by the carrying wheel next lower to the one engaged by the master wheel for imparting to said master wheel an added step of movement coincident with the movement of said lower carrying wheel.

2. In a calculating machine, the combination of: a plurality of totalizers; a master wheel adapted to actuate said totalizers, and algebraic-total mechanism therefor, said algebraic-total mechanism being composed of two parts, the first of said parts being duplicated for each of said totalizers and being fixed relative to said totalizer, the other part not being duplicated for each of said totalizers and traveling from totalizer to totalizer, said algebraic totalizer mechanism being so arranged as to give said master wheel an added unit of movement coincident with the passage of the highest wheel of the then engaged totalizer through zero.

3. In a calculating machine, the combination of: a plurality of carrying wheels; actuating means adapted to engage said carrying wheels *seriatim;* and means for giving said actuating means an added increment of movement coincident with the passage of the carrying wheel of next lower order to the engaged carrying wheel through its carrying point.

4. In a calculating machine, the combination of: a plurality of carrying wheels; a master wheel adapted to engage said carrying wheels *seriatim;* and means for giving said master wheel an added increment of movement coincident with the passage of the carrying wheel of next lower order to the engaged carrying wheel through its carrying point.

5. In a calculating machine, the combination of: a moving carriage; a plurality of totalizers mounted thereon, each totalizer embodying a plurality of carrying wheels and tens carrying mechanisms; a master wheel adapted to engage said carrying wheels *seriatim;* and means for giving said master wheel an added increment of movement coincident with the passage of the carrying wheel of next lower order to the engaged carrying wheel through its carrying point.

6. In a calculating machine, the combination of: a moving carriage; a totalizer mounted thereon, said totalizer embodying a plurality of carrying wheels, tens carrying mechanism forming a closed carrying cycle, number bearing means having two sets of numbers, and designating means for said sets; a master wheel adapted to engage said carrying wheels *seriatim;* and means for giving said master wheel an added increment of movement coincident with the passage of the carrying wheel of next lower order to the engaged carrying wheel through its carrying point.

7. In a calculating machine, the combination of: a moving carriage; a totalizer mounted thereon, said totalizer embodying a plurality of carrying wheels, tens carrying mechanism forming a closed carrying cycle, two sets of numbers, and designating means for said sets, said designating means shifting from one set of figures to another coincident with the passage of the totalizer through zero; a master wheel adapted to engage said carrying wheels *seriatim;* and means for giving said master wheel an added increment of movement coincident with the passage of the carrying wheel of next lower order to the engaged carrying wheel through its carrying point.

8. In a calculating machine, the combination of: a set of numeral keys; a master wheel; differential mechanism connecting said keys and master wheel; and means brought into operation independently of said keys for giving said master wheel an added increment of movement coincident with the movement of said master wheel due to said numeral keys.

9. In a calculating machine, the combination of: a set of numeral keys; a master wheel; differential mechanism connecting said keys and master wheel; a totalizer having a plurality of carrying wheels adapted to be engaged by said master wheel *seriatim;* and means controlled by said totalizer for giving said master wheel an added increment of motion coincident with the passage of the highest wheel of said totalizer through zero.

10. In a calculating machine, the combination of: a set of numeral keys; a master wheel; differential mechanism connecting said keys and master wheel; a plurality of totalizers each having a plurality of carrying wheels adapted to be engaged by said master wheel *seriatim;* and means controlled by said totalizer for giving said master wheel an added increment of motion coincident with the passage of the highest wheel of the then engaged totalizer through zero.

11. In a calculating machine, the combination of: a set of numeral keys; a master wheel; differential mechanism connecting said keys and master wheel; a plurality of totalizers each having a plurality of carrying wheels adapted to be engaged by said master wheel *seriatim;* and means controlled by said totalizer and brought into action coincident with the passage of the totalizer through zero for giving said master wheel an added increment of motion.

In witness whereof, I have hereunto signed my name, this 18th day of August, 1913.

HYMAN ELI GOLDBERG.

Witnesses:
M. SHIMMER,
DAVID W. GOLDBERG.